US008925657B2

(12) United States Patent
Kamen et al.

(10) Patent No.: US 8,925,657 B2
(45) Date of Patent: *Jan. 6, 2015

(54) CONTROL OF A TRANSPORTER BASED ON ATTITUDE

(71) Applicant: DEKA Products Limited Partnership, Manchester, NH (US)

(72) Inventors: Dean Kamen, Bedford, NH (US); Richard Kurt Heinzmann, Francestown, NH (US); Robert R. Ambrogi, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,587

(22) Filed: Jun. 3, 2013

(65) Prior Publication Data
US 2013/0268145 A1 Oct. 10, 2013

Related U.S. Application Data

(63) Continuation of application No. 11/691,903, filed on Mar. 27, 2007, now Pat. No. 8,453,768, which is a continuation of application No. 10/617,598, filed on Jul. 11, 2003, now Pat. No. 7,210,544.

(60) Provisional application No. 60/395,589, filed on Jul. 12, 2002.

(51) Int. Cl.
B62D 57/00 (2006.01)
B62D 61/00 (2006.01)
B60G 17/00 (2006.01)
B62K 11/00 (2006.01)
B62D 51/00 (2006.01)
B62D 51/02 (2006.01)
B62K 3/00 (2006.01)

(52) U.S. Cl.
CPC .............. B62K 11/00 (2013.01); B06G 17/019 (2013.01); B62D 51/002 (2013.01); B62D 51/02 (2013.01); B62K 3/007 (2013.01); B60G 2400/82 (2013.01)
USPC .............. 180/7.1; 180/21; 180/218; 180/282; 280/5.502; 280/5.513

(58) Field of Classification Search
USPC .......... 180/7.1, 21, 218, 271, 282; 280/5.502, 280/5.513
See application file for complete search history.

(56) References Cited

U.S. PATENT DOCUMENTS 4,836,578 A * 6/1989 Soltis ........................... 280/6.15
8,453,768 B2 * 6/2013 Kamen et al. ................. 180/7.1

FOREIGN PATENT DOCUMENTS

JP 4-201793 * 7/1992

Primary Examiner — Joseph M Rocca
Assistant Examiner — Marc A Scharich
(74) Attorney, Agent, or Firm — McCormick, Paulding & Huber LLP

(57) ABSTRACT

A transporter for transporting a load over a surface. The transporter includes a support platform for supporting the load. The support platform is characterized by a fore-aft axis, a lateral axis, and an orientation with respect to the surface, the orientation referred to as an attitude. At least one ground-contacting element is flexibly coupled to the support platform in such a manner that the attitude of the support platform is capable of variation. One or more ground-contacting elements are driven by a motorized drive arrangement. A sensor module generates a signal characterizing the attitude of the support platform. Based on the attitude, a controller commands the motorized drive arrangement.

19 Claims, 4 Drawing Sheets

CONTROL OF A TRANSPORTER BASED ON ATTITUDE

CROSS REFERENCE TO RELATED APPLICATIONS

This application is a continuation of U.S. application Ser. No. 11/691,903 filed Mar. 27, 2007, which is a continuation of U.S. patent application Ser. No. 10/617,598, filed Jul. 11, 2003, which claims priority from United States provisional patent application Ser. No. 60/395,589, filed Jul. 12, 2002, each of which is hereby incorporated by reference herein in its entirety.

TECHNICAL FIELD

The present invention pertains to transporters and methods for transporting a load, which may be a living subject, and more particularly to controlling motion of a transporter.

BACKGROUND ART

A wide range of vehicles having a motorized drive arrangement are known for conveying various subjects, either for purposive locomotion or for recreational purposes.

The means used to command the motorized drive arrangement of these vehicles varies greatly. For example, an operator may manipulate an accelerator pedal to control forward motion of an automobile, while steering is typically performed using a steering wheel. Or the motion of a sporting vehicle may be controlled by rocking a foot board upon which a user is balanced towards the front or rear to mechanically move a throttle cable, as described in U.S. Pat. No. 4,790,548 (Francken). Based on the operator's physical attributes for example, or the transporter's intended functionality, alternative methods for controlling motion of a transporter may be desirable.

SUMMARY OF THE INVENTION

In a first embodiment of the invention there is provided a transporter for transporting a load over a surface. The transporter includes a support platform for supporting the load. The support platform is characterized by a fore-aft axis, a lateral axis, and an orientation with respect to the surface, the orientation referred to as an attitude. At least one ground-contacting element, which is driven by a motorized drive arrangement, is coupled to the support platform in such a manner that the attitude of the support platform is capable of variation. A sensor module generates a signal characterizing the attitude of the support platform. Based on the attitude, a controller commands the motorized drive arrangement.

In accordance with related embodiments of the invention, one or more ground-contacting elements may be flexibly coupled to the support platform in such a manner that the attitude of the support platform is capable of variation based on a position of a center of mass of the load relative to the at least one ground-contacting element. The sensor module may include at least one distance sensor for measuring a distance characteristic of the attitude of the platform. The distance sensor may be selected from the group of distance sensors consisting of an ultrasonic distance sensor, an acoustic distance sensor, a radar distance sensor, optical distance sensor, and a contact sensor, such as a whisker(s). The at least one distance sensor may sense the distance between a fiducial point on the platform and a position on the surface disposed at a specified angle with respect to the support platform. In other embodiments, the transporter may include a first component that remains in a substantially fixed vertical position relative to the surface, wherein the at least one distance sensor senses the distance between a fiducial point on the platform and the first component. One or more ground contacting elements may include a wheel having an axle, and the first component is fixed relative to the axle. Alternatively, and not meant to be limiting, one or more ground contacting elements may include a wheel supported by a frame, and the first component is fixed relative to the frame.

In accordance with other related embodiments of the invention, the attitude of the support platform is capable of variation based at least on a signal generated by a remote control device. The transporter may include a powered strut coupled to the platform, the powered strut capable of varying the attitude of the support platform based at least on the signal generated by the remote control device. The transporter may further include a user interface, wherein the attitude of the support platform is capable of variation based on a signal generated by the user interface. The controller may command motion of the transporter in the fore-aft plane and/or the lateral plane.

In accordance with another embodiment of the invention, a method for controlling a transporter having a support platform for supporting a load is presented. The support platform is characterized by an attitude with respect to the surface. The transporter includes at least one ground contacting elements flexibly coupled to the support platform in such a manner that the attitude of the platform is capable of variation. The transporter also includes a motorized drive arrangement for driving the at least one ground contacting elements. The method includes generating a signal characterizing an attitude of the support platform. The motorized drive arrangement is commanded based at least on the attitude.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
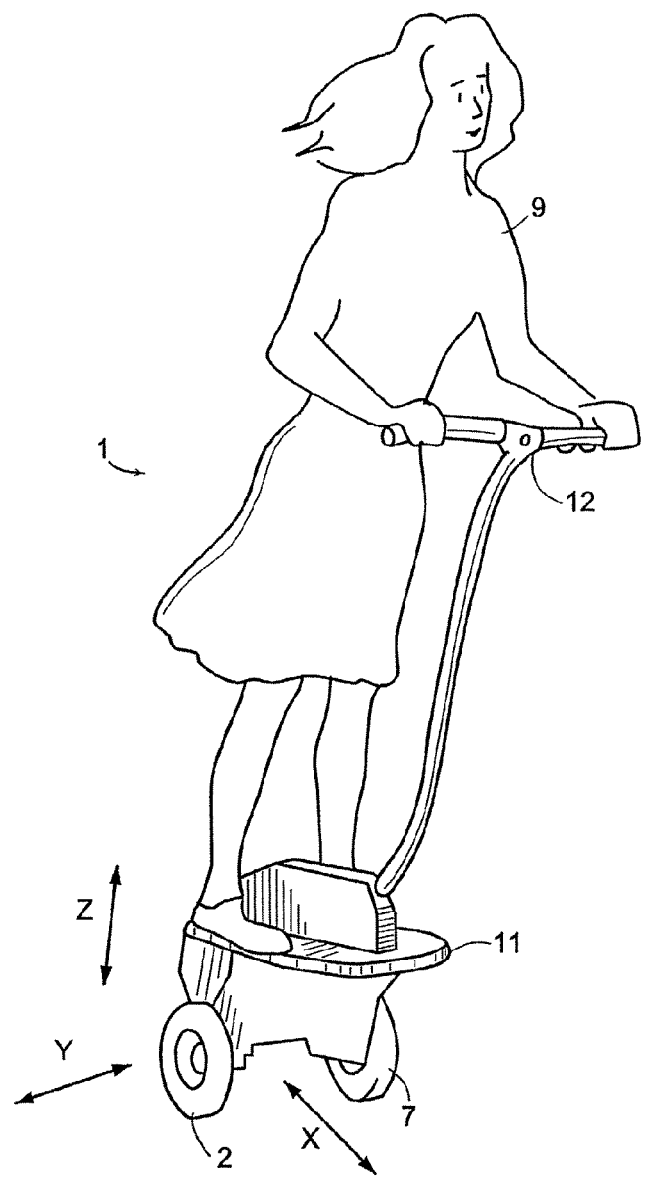
FIG. 1 depicts one embodiment of a human transporter, lacking a distinct user input device, to which the present invention may advantageously be applied.

In accordance with one embodiment of the invention, FIG. 1 shows a transporter, 1 lacking a distinct input device, to which the present invention may advantageously be applied. Transporter 1 is described in detail in U.S. Pat. No. 6,302,230, which is incorporated herein by reference in its entirety. Transporter 1 includes a support platform 11 for supporting a load, which may be a living subject 9, over the ground or other surface, such as a floor, which may be referred to herein generally as "ground". A subject, for example, may stand or sit on support platform 11. Attached to support platform 11 may be a handlebar 12 that can be gripped when riding transporter 1.

One or more ground-contacting elements 2, 7 provide contact between support platform 11 and the ground. Ground-contacting elements 2, 7 may include, but are not limited to, arcuate members, tracks, treads, and wheels (hereinafter the term "wheel" will be used in the specification to refer to any such ground-contacting element without limitation). While the transporter 1 depicted in FIG. 1 lacks stability in its operating position unless subject to controlled balancing, the application of the present invention is specifically not limited to transporters of that sort and embodiments of the present invention may advantageously be applied to statically stable transporters as well.

Support platform 11 may be flexibly coupled to the wheels 2, 7 by various means known in the art, for example, a pivot mechanism, springs, or pneumatic pistons. In other embodiments, the wheels 2, 7 may have some compliance and serve the function of a spring. For purposes of the present description, platform 11 may be characterized by a fore-aft axis, a lateral axis, and an orientation with respect to the surface, which is referred to herein as an attitude. The fore-aft axis, X-X, is perpendicular to the wheel axis, while the lateral axis, Y-Y, is parallel to the axis of the wheels. Directions parallel to the axes X-X and Y-Y are called the fore-aft and lateral directions respectively.

Figure 2:
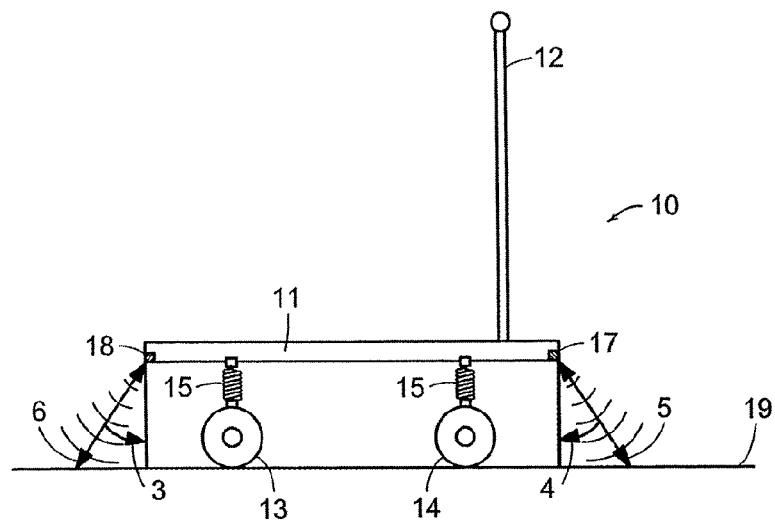
FIG. 2 is a side view of a transporter, in accordance with one embodiment of the invention.

Referring now to FIG. 2, which shows a transporter 10 in accordance with one embodiment of the invention, the attitude of support platform 11 may, for example, be capable of variation based on a position of a center of mass of the load relative to one or more wheels 13, 14. Alternatively, transporter 10 may include a power strut or other mechanism capable of altering the attitude of the support platform 11. The power strut may be controlled by a user interface located on transporter 10, such as a joystick or a rotatable potentiometer located on handlebar 12. In other embodiments, the power strut may also be controlled by a remote control device, such as, but not limited to, an infrared or radio controlled remote control device.

The motion of transporter 10 is based, at least in part, on the attitude of the support platform 11. To determine the attitude of the support platform 11, transporter 10 includes a sensor module. Sensor module may include at least one distance sensor 17, 18 for measuring a distance characteristic of the attitude of the support platform 11. The distance measured may be, for example, the distance between a fiducial point on the support platform 11 and a surface 19, or alternatively, another component on transporter 10. A plurality of distances measured by the sensor module may be combined to generate at least one signal characteristic of the platform attitude.

Attitude/distance sensor may be one of many sensor types, such as, for example, an ultrasonic, optical, acoustic or radar sensor wherein a signal generated by a source is reflected back by a surface to a sensor receiver. The distance from the sensor to the surface can then be calculated based on the time (or phase) difference between when the signal was generated and when the reflected signal was received. Triangulation may be performed. In other embodiments, distance sensor can be a contact sensor(s) such as, without limitation, a whisker(s). For example, a plurality of whiskers, each having a predetermined length may be utilized, with distance determined based on which whisker bends or is otherwise activated when making contact with the surface. A single whisker may be utilized with distance determined based, at least on part, on the bending angle of the whisker.

Referring to FIG. 2, distance sensors 17, 18 sense the distance between a fiducial point on the platform and a position on the surface that is disposed at a specified angle 3, 4, with respect to the support platform. First distance sensor 17 is located at the front (fore) of platform 11 and senses a first distance 5 between platform 11 and surface 19.

Second distance sensor 17 is located at the back (aft) of platform 11 and senses a second distance 6 between platform 11 and surface 19. By comparing distances 5 and 6, a signal indicative of an attitude of the platform 11, and more specifically, the inclination of the platform 11 in the fore-aft plane with respect to the surface 19, can be determined.

Figure 3:
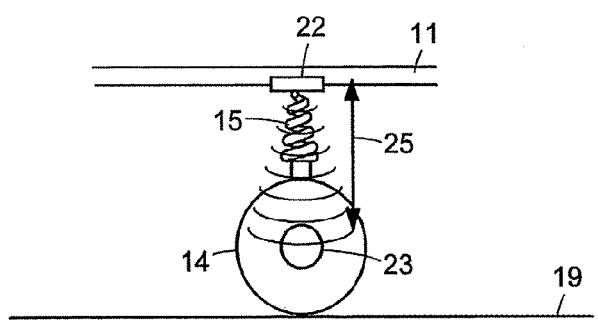
FIG. 3 is an expanded side view of a transporter, in accordance with one embodiment of the invention.

In another embodiment, at least one distance sensor 22 may sense the distance between a fiducial point on the transporter platform 11 and a first component 23 that remains in a substantially fixed vertical position relative to the surface 19, as shown in the expanded view of a transporter in FIG. 3. First component 23 may be, for example, a wheel axle 23 or a frame used to support the at least one wheel 14. In various embodiments, first component 23 may include a reflector for reflecting the signal generated by distance sensor 22.

Figure 4:
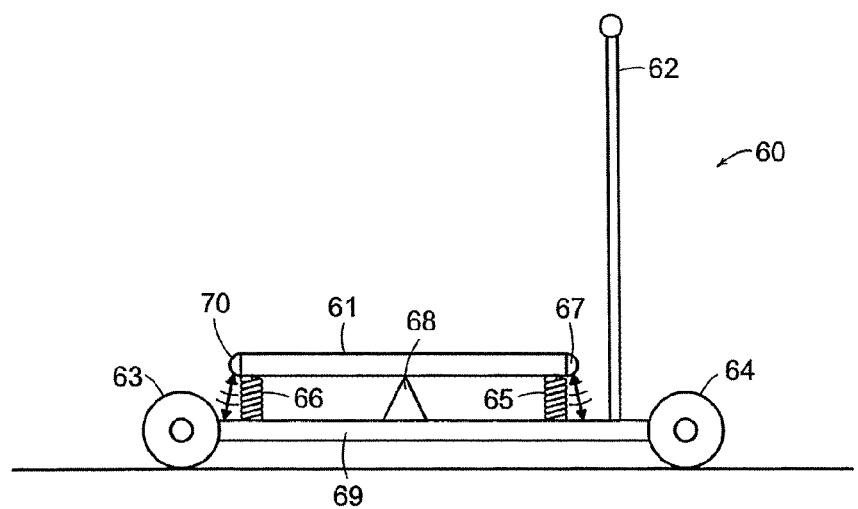
FIG. 4 is a side view of a transporter, in accordance with one embodiment of the invention.

FIG. 4 shows a transporter 60 that includes a first support platform 69 and a second support platform 61, in accordance with one embodiment of the invention. At least one wheel 63 and 64 provides contact between the first support platform 69 and the ground. Second support platform 61 is coupled to the first support platform 69 such that the second support platform 61 can tilt in the fore-aft plane based, for example, on a position of a center of mass of the loaded second support platform 61. Second support platform 61 may be tiltably attached to the first support platform 69 using, without limitation, springs 65 and 66 and/or a pivot mechanism 68. Similar to above-described embodiments, based on the tilting of the second support platform 61, at least one sensor 67 and 70 generates a signal indicative of the attitude of the second support platform 61. Attached to the first support platform 69 or second support platform 61 may be a handlebar 62 that can be gripped while operating the transporter 60.

A controller receives the signal characteristic of the attitude from the sensor module. Based at least on this signal, the controller implements a control algorithm to command a motorized drive arrangement so as to drive the at least one wheel. The controller may also respond to commands from other operator interfaces, such as a joystick or dial attached, for example, to handlebar.

Figure 5:
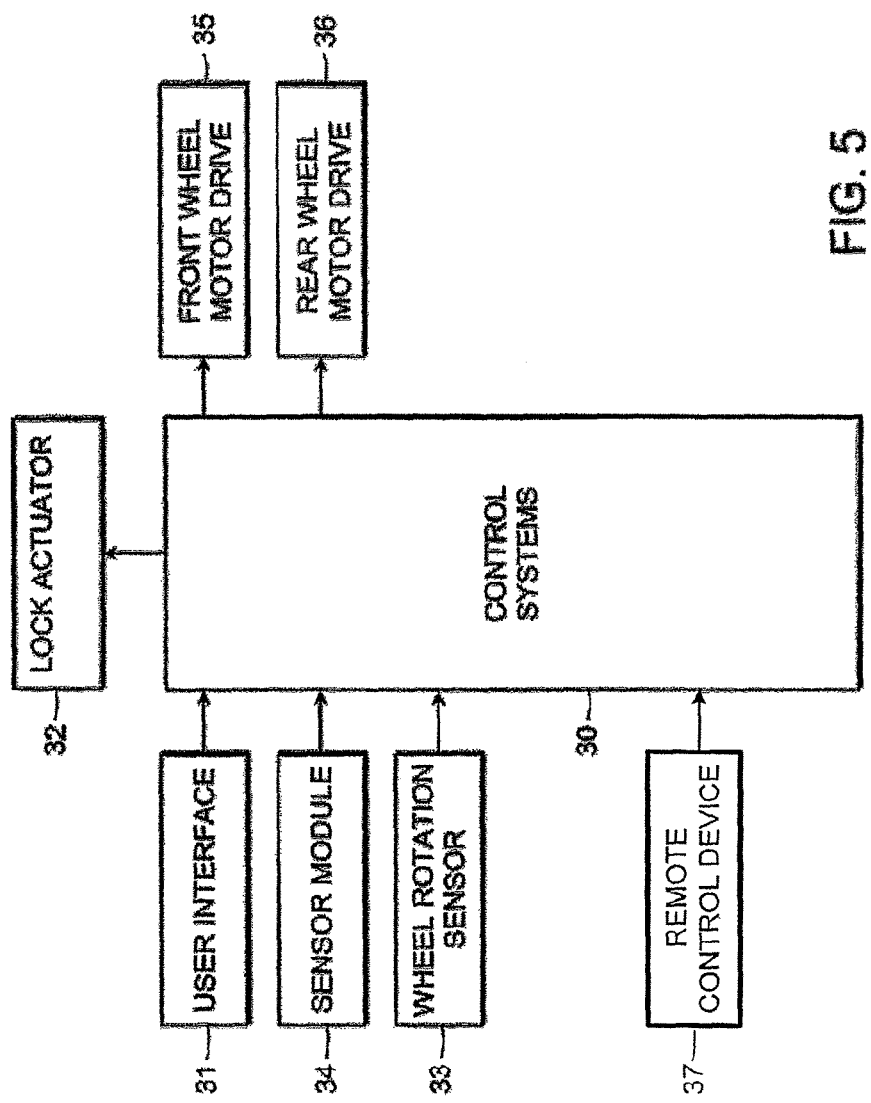
FIG. 5 is a block diagram of a controller of a transporter, in accordance with one embodiment of the invention.

FIG. 5 shows a controller 30 for controlling the motorized drive of the transporter, in accordance with one embodiment of the invention. Controller 30 receives an input characteristic of platform attitude from sensor module 34. Based at least on the input from the sensor module, controller 30 commands at least one motorized drive 35, 36. Controller 30 also interfaces with a user interface 31 and a wheel rotation sensor 33.

User interface 31 may include, among other things, controls for turning the controller 30 on or off. When the controller 30 is turned off, the at least one wheel of the transporter may be free to move, such that the transporter acts as a typical push scooter. User interface 31 may also control a locking mechanism 32 for locking the at least one wheel.

The controller 30 includes a control algorithm to determine the amount of torque to be applied to the at least one wheel based on the sensed attitude of the support platform. The control algorithm may be configured either in design of the system or in real time, on the basis of current operating mode and operating conditions as well as preferences of the user. Controller may implement the control algorithm by using a control loop. The operation of control loops is well known in the art of electromechanical engineering and is outlined, for example, in Fraser & Milne, Electro-Mechanical Engineering, IEEE Press (1994), particularly in Chapter 11, "Principles of Continuous Control" which is incorporated herein by reference.

As an example, and not meant to be limiting, the control algorithm may take the form:

Torque Command to Wheel=$K [\theta+o]$ where K=gain
$\theta$=support platform attitude, and
o=offset.

The support platform attitude, $\theta$, may be in the form of an error term defined as the desired support platform attitude minus the measured support platform attitude. The gain, K, may be a predetermined constant, or may be entered/adjusted by the operator through user interface 31. Responsiveness of the transporter to attitude changes can be governed by K. For example, if K is increased, a rider will perceive a stiffer response in that a small change in platform attitude will result in a large torque command. Offset, o, may be incorporated into the control algorithm to govern the torque applied to the motorized drive, either in addition to, or separate from, the direct effect of $\theta$. Thus, for example, the user may provide an input by means of a user interface of any sort, the input being treated by the control system equivalently to a change, for example, in platform attitude.

Thus, referring back to FIG. 2, motion of the transporter 10 maybe controlled by a subject changing the attitude of the platform 11. This change in attitude is reflected by distances 5, 6 sensed by the sensor module. Depending on the control algorithm, an initial change in attitude, such that first distance 5 is less than second distance 6, may result in positive torque being applied to one or more wheels 23, 24, causing the wheels 23, 24 to move forward. Likewise, an initial change in the attitude, such that first distance 5 is greater than second distance 6 may result in a negative torque applied to one or more wheels 23, 24, causing the wheels 23, 24 to move in the aft direction. If the subject then remains in his changed position on the platform such that the platform attitude remains the same, the motor will continue to torque at approximately the same rate.

In various embodiments of the invention, the sensor module may sense changes in platform attitude in addition to, or instead of inclination of support platform in the fore-aft plane. For example, sensor module may provide an attitude signal indicative of inclination of the support platform in the lateral plane relative to the surface. This may be accomplished by the use of two laterally disposed distance sensors. Changes in the angle of inclination of the support platform in the lateral plane can then be used either separately or in combination with other attitude changes to control motion of the transporter. For example, changes in the angle of inclination in the fore-aft plane can be used to control fore-aft motion, while changes in the angle of inclination in the lateral plane can be used to control steering of the transporter.

Steering may be accomplished, in an embodiment having at least two laterally disposed wheels (i.e., a left and right wheel), by providing separate motors for left and right wheels. Torque desired for the left motor and the torque desired from the right motor can be calculated separately. Additionally, tracking both the left wheel motion and the right wheel motion permits adjustments to be made, as known to persons of ordinary skill in the control arts, to prevent unwanted turning of the vehicle and to account for performance variations between the two motors.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A transporter for transporting a load over a surface, the transporter comprising:
   a support platform for supporting the load, the support platform characterized by a fore-aft axis and a lateral axis;
   at least one ground-contacting element coupled to the support platform in such a manner that the orientation of the support platform is capable of variation with respect to at least a first component of the transporter that remains in a substantially fixed vertical position relative to the surface, the surface being beneath and in contact with the at least one ground-contacting element, the orientation referred to as an attitude;
   a motorized drive arrangement for driving the at least one ground-contacting element;
   a sensor module for generating an attitude signal characterizing the attitude of the support platform; and
   a controller for commanding the motorized drive arrangement to apply a torque to one or more of the ground-contacting elements as a function of the attitude of the support platform based upon the attitude signal generated by the sensor module.

2. The transporter according to claim 1, wherein the attitude signal is indicative of an angle of inclination of the support platform in a fore-aft plane.

3. The transporter according to claim 2, wherein the angle of inclination of the support platform in the fore-aft plane is used to control motion of the transporter in the fore-aft plane.

4. The transporter according to claim 3, wherein changes in the angle of inclination of the support platform in the fore-aft plane are used to control motion of the transporter in the fore-aft plane.

5. The transporter according to claim 4, wherein the one or more ground contacting elements includes a wheel supported by a frame, and the at least one first component is fixed relative to the frame.

6. The transporter according to claim 1, wherein the attitude signal is indicative of an angle of inclination of the support platform in a lateral plane.

7. The transporter according to claim 6, wherein the angle of inclination of the support platform in the lateral plane is used to control steering of the transporter.

8. The transporter according to claim 7, wherein changes in the angle of inclination of the support platform in the lateral plane are used to control steering of the transporter.

9. The transporter according to claim 8, wherein the one or more ground contacting elements includes a wheel supported by a frame, and the at least one first component is fixed relative to the frame.

10. The transporter according to claim 1, wherein the attitude signal is indicative of angles of inclination of the support platform in both fore-aft and lateral planes.

11. The transporter according to claim 10, wherein the angle of inclination of the support platform in the lateral plane is used to control steering of the transporter.

12. The transporter according to claim 11, wherein the one or more ground contacting elements includes a wheel supported by a frame, and the at least one first component is fixed relative to the frame.

13. A method for controlling a transporter having a support platform for supporting a load, the support platform characterized by an attitude with respect to at least a first component of the transporter that remains in a substantially fixed vertical position relative to the surface beneath the transporter, the transporter including at least one ground contacting element flexibly coupled to the support platform in such a manner that the attitude of the platform is capable of variation, the transporter further including a motorized drive arrangement for driving the at least one ground contacting element, the method comprising: generating a signal characterizing the attitude of the support platform; and commanding the motorized drive arrangement to apply a torque to one or more of the ground-contacting elements as a function of the attitude based upon the signal.

14. A method according to claim 13, wherein generating the signal includes determining an inclination of the support platform in a fore-aft plane.

15. A method according to claim 14, wherein generating the signal includes determining a change in the inclination of the support platform in the fore-aft plane.

16. A method according to claim 13, wherein generating the signal includes determining an inclination of the support platform in a lateral plane.

17. A method according to claim 16, wherein generating the signal includes determining a change in the inclination of the support platform in the lateral plane.

18. A method according to claim 13, wherein generating the signal includes determining an inclination of the support platform in fore-aft and lateral planes.

19. A method according to claim 18, wherein generating the signal includes determining a change in the inclination of the support platform in the fore-aft and lateral planes.

* * * * *